United States Patent [19]

Mohr et al.

[11] 3,966,405
[45] June 29, 1976

[54] N-ALKYL NITRO PHENYL DIETHYLENE TRIAMINE DYEING OF ACID MODIFIED SYNTHETIC FIBERS

[75] Inventors: Reinhard Mohr, Offenbach am Main; Manfred Hahnke, Kelkheim, Taunus, both of Germany

[73] Assignee: Hoechst Aktiengesellschaft, Frankfurt am Main, Germany

[22] Filed: Mar. 17, 1975

[21] Appl. No.: 558,783

[30] Foreign Application Priority Data
Dec. 17, 1974 Germany............................ 2459564

[52] U.S. Cl. ................................. 8/168 A; 8/168 B; 8/168 C; 8/41 R; 8/41 A; 8/41 B; 8/41 C; 8/39 R; 8/39 A; 8/39 B; 8/39 C; 8/177 AB
[51] Int. Cl.² ............................................ D06P 5/00
[58] Field of Search .................... 8/168 A–168 D, 8/41 R, 39 R, 177 AB

[56] References Cited
UNITED STATES PATENTS

| | | |
|---|---|---|
| 2,202,169 | 5/1940 | Schlack ............................. 8/94.23 |
| 2,238,949 | 4/1941 | Schlack ................................. 8/29 |
| 3,622,608 | 11/1971 | Schafer ............................ 8/177 AB |

FOREIGN PATENTS OR APPLICATIONS
1,941,376   2/1971   Germany .......................... 8/177 AB

*Primary Examiner*—Donald Levy
*Attorney, Agent, or Firm*—Connolly and Hutz

[57] ABSTRACT

Dyestuffs of the formula

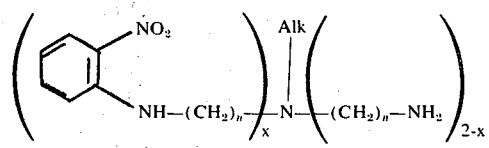

in which Alk is lower alkyl and in which the phenyl nucleus may be further substituted by nonionic substituents, $n$ is 2 to 6 and $x$ is a number of 1 up to but excluding 2, are useful for dyeing polymers containing acidic groups. These dyestuffs yield stable compositions containing 20 to 40 % by weight of one or more of said dyestuffs, 20 to 40 % by weight of an organic solvent, 20 to 40 % by weight of a nonionic dispersant of the alkylphenolpolyglycolether or fat alcohol polyglycolether type and up to 20 % by weight of water.

8 Claims, No Drawings

N-ALKYL NITRO PHENYL DIETHYLENE TRIAMINE DYEING OF ACID MODIFIED SYNTHETIC FIBERS

The copending U.S. Pat. application Ser. No. 558,784 filed concurrently herewith, relates to a process for dyeing polymers containing acid groups with basic nitro dyestuffs, which comprises using dyestuffs of the formula (I)

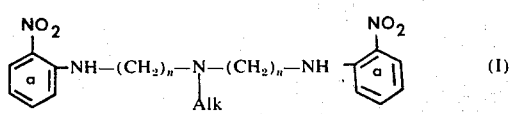

wherein Alk is alkyl having 1 to 6 carbon atoms, $n$ stands for an integer of from 2 to 6 and the benzene radicals $a$ may be substituted by further non-ionic substituents.

As a further modification of this process is has now been found that polymers containing acid groups can also be dyed in fast shades, when using — in modification of the process of said copending application nitro dyestuffs of the formula (II)

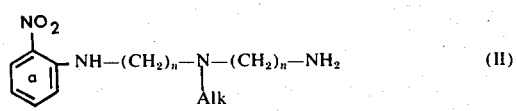

wherein Alk, $n$ and $a$ have the above meanings, or the mixtures thereof with nitro dyestuffs of the above formula (I).

These dyestuffs are encompassed by the formula

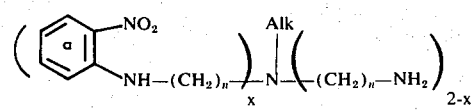

in which Alk, $a$ and $n$ have the above meanings and $x$ is a number of 1 up to but excluding 2.

As particularly favorable have been proved the dyestuffs of the formula (IIa)

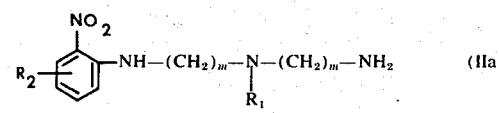

or mixtures of dyestuffs of the formula (IIa) and of the formula (Ia)

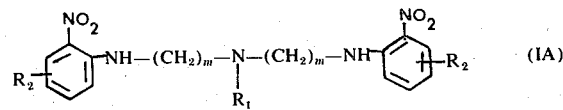

wherein $R_1$ is alkyl having 1, 2 or 3 carbon atoms and $m$ is the integer 2 or 3 and $R_2$ is hydrogen, chlorine, bromine, a carbalkoxy group having 2 to 5 carbon atoms, the nitro group, the sulfonamide, carbonamide, lower monoalkyl or lower dialkyl sulfonamide or -carbonamide group or the cyano, methyl, ethyl, methoxy, ethoxy, acetylamino or methyl or ethylsulfonyl group; particularly those dyestuffs wherein $R_1$ represents methyl or ethyl, preferably methyl, $R_2$ is hydrogen and $m$ is 2 or 3.

The dyestuffs or dyestuff mixtures may be obtained by reacting one mol of a triamine of the formula (III)

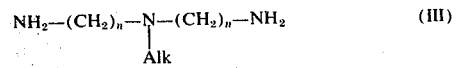

wherein $n$ and Alk have the above meaning, with 1 up to but excluding 2 mols of a compound of the formula (IV)

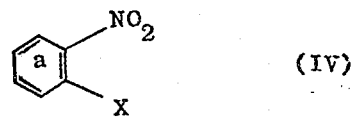

wherein X is fluorine, chlorine or bromine and $a$ has the above meaning, in the presence of acid binding agents.

Substituents which may be additionally contained in the benzene nucleus $a$ of the formulae (I), (II) and (IV), are for example halogen atoms, such as chlorine or bromine atoms, alkyl groups, especially those having 1 to 4 carbon atoms, alkoxy groups, especially those having 1 to 4 carbon atoms, aralkoxy groups, such as the benzyloxy or phenethyloxy groups, aryl groups, as for example the phenyl group, acyl, especially lower alkanoyl, such as acetyl or propionyl, or benzoyl, aryloxy, such as phenoxy, azo, such as phenylazo, aralkyl, such as benzyl or phenethyl, carboxylic acid ester groups, especially carboxylic acid alkyl ester groups having 1 to 4 carbon atoms in the alkyl radical, optionally substituted, especially alkylated carboxylic acid amide groups, cyano, nitro, hydroxy, trifluoromethyl, alkylsulfonyl groups, especially those having 1 to 4 carbon atoms, arylsulfonyl, especially phenyl or tolyl sulfonyl, acyloxy, especially lower alkynoyloxy such as acetoxy or propionyloxy or benzoyloxy, acylamino, especially benzoylamino or lower alk noylamino groups, especially those having 1 to 4 carbon atoms, or arylsulfonylamino groups, such as the phenyl or p-toluylsulfonylamino group.

The dyestuffs or dyestuff mixtures may be applied in the form of the free bases as well as in the form of the salts thereof with organic or inorganic acids, for example as salts of hydrohalic acids, for example hydrochloric acid, phosphoric acids, of sulfuric acid, nitric acid, boric acid, sulfamic acid, of lower aliphatic carboxylic acids, as for example the formic acid, acetic acid, propionic acid or lactic acid, or of aromatic carbocylic acids, for example benzoic acid.

The dyeing of textile materials is carried out by treating the material in acidic baths preferably in baths containing acetic or a mineral acid, which contain the dyestuff and optionally auxiliaires, and completing the dyeings thus obtained in usual manner. Generally, the material is introduced into the dyebath at about 40° to 60°C and dyed at boiling temperature. The material may also by dyed under pressure above 100°C.

To print textile materials the dyestuffs are used together with the usual acidic thickeners and, if desired, printing auxiliaries and the dyestuffs are fixed in usual manner by steaming.

The dyeing may also be carried out in an organic solvent, for example in an aliphatic chlorohydrocarbon, in the presence of amines, aminoxides or ammonium compounds and, if desired, emulsifiers.

To prepare the aqueous dyebaths and printing pastes the dyestuffs or dyestuff mixtures may be used in the form of powders which optionally contain a solid acid, for example oxalic acid, boric acid or sulfamic acid, an acidic sulfate or phospate and/or another diluent, as for example inorganic salts, dextrin, sugar and, if desired, further additives. However, it is more advantageous to use concentrated aqueous solutions of the dyestuffs easier to handle, which contain about 20 to 60 % of dyestuff, one or more lower aliphatic carboxylic acids, such as formic acid, acetic acid, propionic acid or lactic acid, as well as, if desired, further additives, as for example water-soluble polyhydric alcohols, sich as ethylene glycol, the ethers or esters therof, polyethers, aliphatic carboxylic acid amides, lactames, lactones, nitriles, dimethylsulfoxide, diacetone-alcohol, dioxane, tetrahydrofuran or urea as well as water.

Particularly suitable are dyestuff preparations which contain about 20 to 40% of the dyestuff of dyestuff mixture, 20 to 40% of an organic solvent, 20 to 40 % of a non-ionic dispersing agent of the alkylphenolpolyglycol ether or fatty alcohol polyglycolether type as well as 0 to 20 % of water.

To prepare the dyebaths which contain only organic solvents, for example chlorohydrocarbons, there are preferably used concentrated solutions containing the dyestuff as a free base or as a salt of a mono-basic organic acid, chlorohydrocarbons, organic acids and polar organic solvents.

As textile material there are mentioned for example fibers, threads, flocks, woven and knitted fabrics of polymers of acrylonitrile or of mixed polymers of acrylonitrile with other vinyl compounds, for example vinyl chloride, vinyl fluoride, vinylidene chloride, vinyl acetate or propionate, vinyl pyridine, vinyl imidazole, vinyl pyrrolidone, vinyl alcohol, acryl- or methacrylic acid esters or acrylamides which contain acid groups due to the preparation. Furthermore, there are considered acid-modified polyacrylonitrile materials, as they are described for example in U.S. Pat. Nos. 2,837,500 and 2,737,501, as well as acid-modified polyamide fibres, as for example polycondensation products from 4,4'-diamino-2,2'-diphenyl-disulfonic acids or 4,4'-diamino-2,2'-diphenyl-alkane-disulfonic acids with starting substances forming polyamide, polycondensation products or monoaminocarboxylic acids or the amide-forming derivatives or dibasic carboxylic acids and diamines with aromatic dicarboxy-sulfonic acids, for example polycondensation products of caprolactoame or hexamethylene-diammonium -diammonium adipate with potassium-3,5-dicarboxy-benzene-sulfonate, or acid-modified polyester fibres, such as polycondensation products or aromatic polycarboxylic acids, for example terephthalic acid or isophthalic acid, with polyhydric alcohols, as for example ethylene glycol and 1,2- or 1,3-dihydroxy-3-(3'-sodiumsulfopropoxy)-propane, 2,2-dimethylol-1-(3'-sodium-sulfopropoxy)-butane, 2,2-bis-(3'-sodiumsulfopropoxyphenyl)-propane or 3,5-dicarboxy-benzene-sulfonic acid or sulfonated terephthalic acid, sulfonated 4-methoxy-benzene-carboxylic acid or sulfonated diphenyl-4,4'-dicarboxylic acid.

The dyeing may also be carried out by adding the dyestuffs to the spinning solutions used for preparing polyacrylonitrile fibres containing acid groups, or by applying the dyestuff solution onto the unstretched (undrawn) fibre.

The dyeings and prints obtained with the dyestuffs of the invention are characterized by a good fastness to light and to wetting, for example a good fastness to washing, fulling, cross-dyeing, to chlorine, perspiration and carbonization, as well as by a good fastness to decatizing, steaming, ironing, rubbing and to solvents.

As compared with the dyeings obtained with dyestuffs of French Patent Specifications Nos. 1,498,006 and 1,498,007 and German Offenlegungsschrift No. 1,941, 376, the dyeings obtained with the dyestuffs of the invention have surprisingly a better fastness to light and a better color build-up.

The following Examples illustrate the invention. The parts and percentages are by weight.

EXAMPLE 1 a. 10 Parts of bis-(γ-aminopropyl)-methylamine were introduced at 70°–80°C into a three-neck flask with reflux cooler and stirrer and mixed portionwise within 2 hours, while stirring well, with 2 parts of o-nitrochlorobenzene. Stirring was continued for 2 hours at 80°–90°C whereby a melt was obtained which dissolved clearly in 100 parts of a 1% aqueous acetic acid solution with an intense yellow color and which contained the dyestuff of the formula

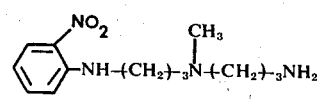

b. 100 g of a pre-cleaned polyacrylonitrile yarn were introduced into a dyebath heated to 60°C of 1 g of crystalline sodium acetate and 5 g of calcinated sodium sulfate in 3 l of water, the liquor was circulated for about 10 minutes and then 10 g of the above dyestuff solution were added.

Then the bath temperature was increased to 85°C, then slowly to 100°C, at a temperature increase of 1°C per 3 to 4 minutes.

When the boiling temperature was reached, the yarn was dyed for 1 to 1 and half hour, whereby bath nearly exhausted. Then the dyebath was cooled to about 70°C, the dyeing good was removed, rinsed warm and cold and dried. A clear yellow dyeing having a very good fastness to wetting and a good fastness to light was obtained.

EXAMPLE 2 a. 315 Parts of o-nitrochloro-benzene were mixed at 90°–100°C within 2 hours, while stirring, with 160 parts of bis-(γ-aminopropyl)-methylamine. The reaction mixture was heated to 110°C and stirring was continued for 1 hour at this temperature. Within 2 hours 125 parts of calcinated sodium carbonate were added and stirring was continued for another 6 hours. The whole was mixed with 500 parts of water of 60°–70°C and stirred for 5 minutes. After stopping the stirrer a separation into two phases was obtained. The upper phase was dicarded. The lower phase was freed from the residual water by a short vacuumdistillation and filtered hot. The clear yellow filtrate was cooled to 40°–50°C and stirred with 490 parts of benzyl alcohol, 50 parts of water and 310 parts of nonyl phenol reacted with 20 mols of ethylene oxide. The resulting low viscous homogeneous preparation contained the dyestuffs

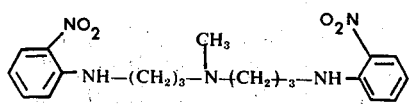

and

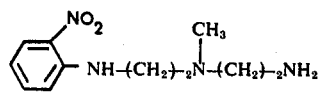

in a weight ratio of 70:30.

b. 15 g of this dyestuff preparation were stirred with 15 ml of 60 % acetic acid and dissolved in 1 liter of boiling water. This solution was poured into a dyebath, which contained in 5 liters of water of 60°C 1.2 g of a dispersing agent of the alkylarylpolyglycol ether type, 5 g of crystallized sodium acetate and 50 g of calcinated sodium sulfate. Then a pre-cleaned cross-wound bobbin with 500 g of polyacrylonitrile yarn was introduced into the dyebath, heated to 85°C and the temperature was slowly increased to 100°C. The yarn was dyed for 1 hour at this temperature whereby the dyebath exhausted. The bath was cooled to 70°C and the dyeing completed as usual. A clear yellow dyeing was obtained having a very good fastness to wetting and a good foastness to light.

EXAMPLE 3:

20 g of dyestuff mixture of the dyestuffs of the formula

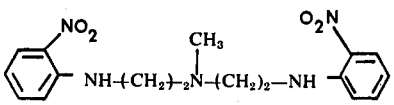

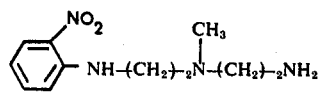

in a weight ratio of 50:50 were dissolved hot with 50 g of β,β′-dihydroxydiethyl sulfide, 30 g of cyclohexanol, 25 g of 60 % acetic acid and 425 g of water and the solution was introduced, while stirring, into 450 g of a crystal gum thickener.

Polyacrylontirile fabrics were printed with this printing paste, dried and steamed for half an hour at 0.2 atmosphere gauge. The material was rinsed and completed as usual.

A clear yellow print was obtained having a very good fastness to wetting and a good fastness to light.

EXAMPLE 4

100 g of a pre-cleaned yarn of acid-modified polyester were introduced into a dyebath heated to about 60°C, which contained in 3 liters of water 18 g of calcinated sodium sulfate and 6 g of a carrier (a mixture of diphenyl and methylnaphthalene); the bath was circulated for about 10 minutes and then a solution of 1 g of a dyestuff mixture of the dyestuffs of the formulae

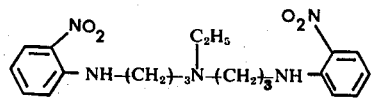

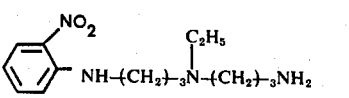

in the weight ratio of 40:60 and 3 ml of 60 % acetic acid in 1 liter of water were added. Then the bath temperature was slowly increased to 100°–110°C (1°C per minute) and the yarn was dyed for 1 hour at this temperature. Then the dyed material was rinsed hot and completed as usual. A clear yellow dyeing having a very good fastness to light and to wetting was obtained.

The following Table contains further mixtures to be used according to the invention consisting of dyestuffs of the formulae I and II as well as the shades of the dyeing on polyacrylonitrile fibres:

| EXAMPLE | Alk | n | Substituent in a | Shade |
|---|---|---|---|---|
| 5 | CH₃ | 3 | 4 - Cl | yellow |
| 6 | CH₃ | 3 | 4 - COOCH₃ | yellow |
| 7 | CH₃ | 3 | 4 - NO₂ | yellow |
| 8 | CH₃ | 3 | 4 - SO₂NH₂ | yellow |
| 9 | CH₃ | 3 | 4 - CONH₂ | yellow |
| 10 | CH₃ | 3 | 4 - CF₃ | yellow |
| 11 | CH₃ | 2 | — | yellow |

| EXAMPLE | Alk | n | Substituent in a | Shade |
|---|---|---|---|---|
| | | | -continued | |
| 12 | $C_2H_5$ | 3 | — | yellow |

EXAMPLE 13

1.5 Parts of a dyestuff of the formula

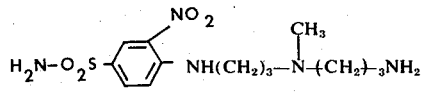

were dissolved, while stirring, in 770 parts of dimethylformamide. 300 Parts of an acid-modified polyacrylonitrile were added to this solution and the whole was heated to 80°C while stirring well. The homogeneous spinning solution thus obtained was filterd and spun according to the known dry spinning process. A fibre material having an intense yellow color was obtained which had excellent fastness properties.

We claim:

1. In a process for the dyeing of high-molecular substrates containing acidic groups with basic nitro groups containing dyestuffs the improvement consisting of contacting said substrate with a dyestuff of the formula

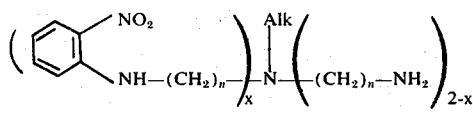

wherein Alk is alkyl of 1 to 6 carbon atoms, $n$ is 2 to 6, $x$ is a number of 1 up to but excluding 2 and wherein the phenyl nuclei can be substituted by halogen, carboalkoxy of 2 to 5 carbon atoms, nitro, sulfamoyl, sulfon amide mono- or di-(lower alkyl)-amide, carbamoyl, carboxylic acid mono- or di-(lower alkyl)-amide, cyano, lower alkyl, lower alkoxy, lower alkanoylamino or lower alkylsulfonyl, or a mixture of said dyestuffs.

2. A process as claimed in claim 1, wherein the high-molecular substrate is a polymer of acrylonitrile, a polyamide or a polyester.

3. A process as claimed in claim 1, wherein said substrate is a fiber material.

4. A process as claimed in claim 1, wherein the dyestuff has the formula

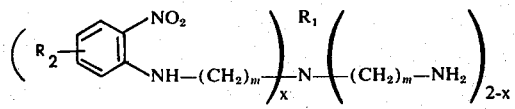

wherein $R_1$ is alkyl of 1 to 3 carbon atoms, $m$ is 2 or 3, $x$ is a number of 1 up to but excluding 2 and $R_2$ is hydrogen chlorine, bromine, carboalkoxy of 2 to 5 carbon atoms, nitro, sulfamoyl, carbamoyl, carboxylic or sulfonic acid mono- or di- alkyl amide with alkyl moieties of 1 to 4 carbon atoms, cyano, methyl, ethyl, methoxy, ethoxy, acetamino, methyl sulfonyl or ethyl sulfonyl.

5. A process as claimed in claim 4, wherein $R_1$ is methyl or ethyl and $R_2$ is hydrogen.

6. A process as claimed in claim 5, wherein $R_1$ is methyl.

7. A process as claimed in claim 1, wherein contacting is effected by immersing the substrate into an aqueous bath of 40° to 120°C of a pH value below 7 containing said dyestuff.

8. A process as claimed in claim 1, wherein contacting is effected by printing the substrate with a printing paste containning said dyestuff.

* * * * *